United States Patent
Riedl

(10) Patent No.: US 7,575,249 B2
(45) Date of Patent: Aug. 18, 2009

(54) HEIGHT-ADJUSTABLE SUPPORT FOR SEMITRAILERS OR THE LIKE

(75) Inventor: Reinhold Riedl, Miltenberg (DE)

(73) Assignee: Georg Fischer Verkehrstechnik GmbH, Singen (DE)

( * ) Notice: Subject to any disclaimer, the term of this patent is extended or adjusted under 35 U.S.C. 154(b) by 912 days.

(21) Appl. No.: 11/000,600

(22) Filed: Nov. 30, 2004

(65) Prior Publication Data

US 2005/0155453 A1 Jul. 21, 2005

(30) Foreign Application Priority Data

Jan. 16, 2004 (DE) .................. 20 2004 000 592 U

(51) Int. Cl.
*B60S 9/06* (2006.01)

(52) U.S. Cl. .................... 280/763.1; 254/419
(58) Field of Classification Search ........... 280/763.1, 280/764.1, 765.1, 766.1; 254/418, 419, 420, 254/424, 425
See application file for complete search history.

(56) References Cited

U.S. PATENT DOCUMENTS

| | | | | |
|---|---|---|---|---|
| 3,768,088 A | * | 10/1973 | Risius | .................. 340/431 |
| 3,888,464 A | * | 6/1975 | Felsen | .................. 254/425 |
| 4,084,777 A | * | 4/1978 | Lambert | .................. 248/287.1 |
| 4,205,824 A | * | 6/1980 | Mai | .................. 254/419 |
| 4,796,864 A | * | 1/1989 | Wilson | .................. 254/425 |
| 5,538,225 A | * | 7/1996 | VanDenberg | .................. 254/419 |
| 6,994,325 B2 | * | 2/2006 | Riedl | .................. 254/419 |
| 7,083,196 B2 | * | 8/2006 | Riedl | .................. 280/763.1 |

FOREIGN PATENT DOCUMENTS

DE 196 16 704 A1 * 10/1997

* cited by examiner

*Primary Examiner*—Frank B Vanaman
(74) *Attorney, Agent, or Firm*—Bachman & LaPointe, P.C.

(57) ABSTRACT

A height adjustable support comprising a stationary outer support tube, an inner support tube arranged in a longitudinally displaceable manner in the outer support tube, a gearbox output shaft mounted for rotational movement in the outer support tube, a bevel gear fixed to the gearbox output shaft, a spindle drive engaged with the bevel gear for displacing the inner support tube within the outer support tube, a gearwheel fixed to the gearbox output shaft and engaging a pinion of a drive motor, for driving the gearwheel, the gearbox output shaft, the bevel gear and the spindle drive for moving the inner support tube, and a switch off device which deactivates the drive motor when an end of the inner support tube abuts a surface.

24 Claims, 2 Drawing Sheets

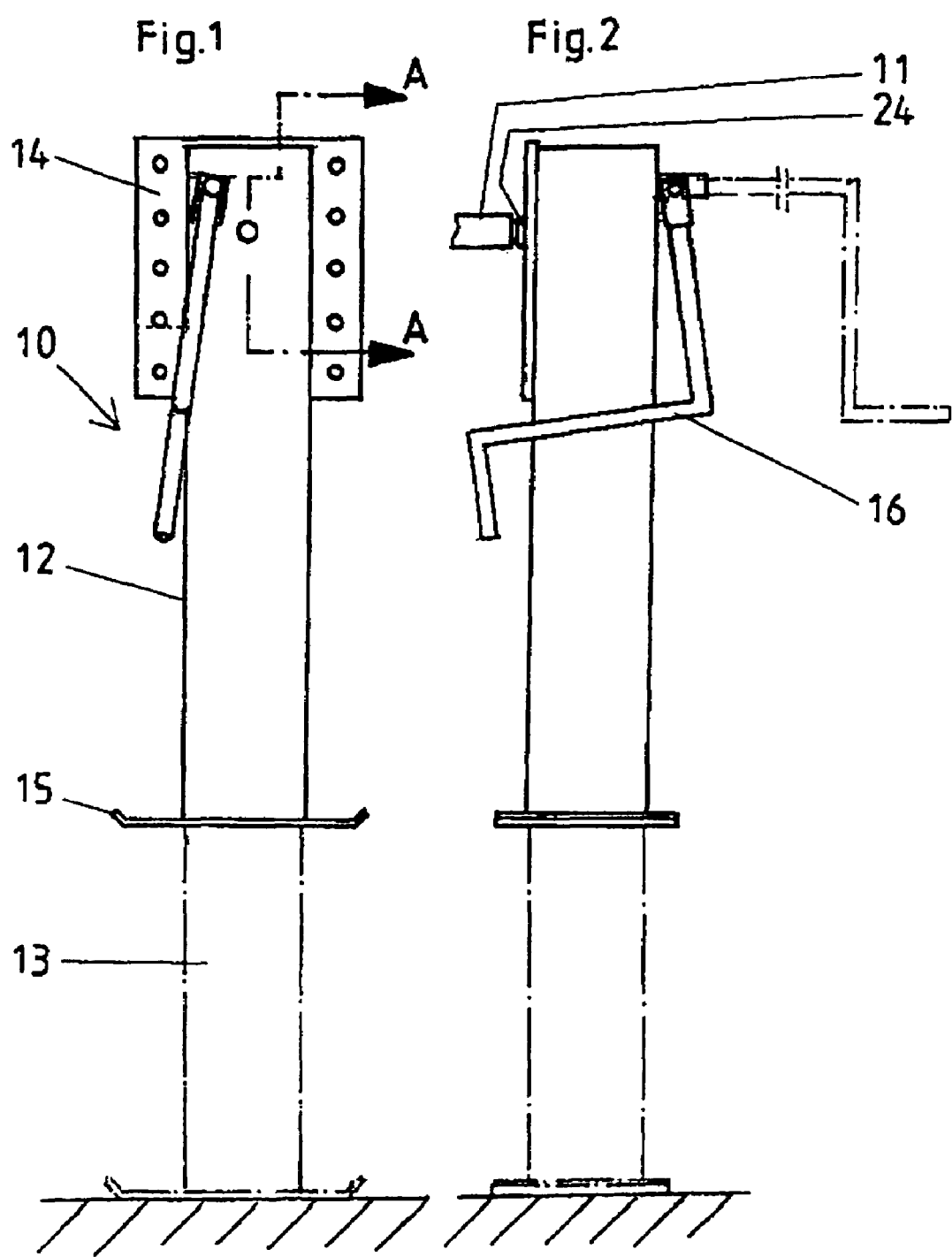

HEIGHT-ADJUSTABLE SUPPORT FOR SEMITRAILERS OR THE LIKE

BACKGROUND OF THE INVENTION

The invention relates to a height-adjustable support for semitrailers. Such supports, usually provided in pairs, are arranged at the front region of the semitrailer.

A support of the generic type is known from DE 203 07 381 U1. Here, a gearwheel is fastened in a rotationally fixed manner on the gearbox output shaft and is driven alternatively via a motor-drive pinion or a manual-drive pinion. The motor is seated on the outside of the support.

EP 1 104 369 B1 discloses an arrangement for supporting a semitrailer of an articulated lorry. Instead of optional manual or motor-driven operational capability, this document disadvantageously proposes, merely in alternative configurations, either a semitrailer support with a manual drive or another one with a motor drive. In addition, the motor is also located outside the tubular support body and projects therefrom.

In the case of such configurations of semitrailer supports, there is a disruptive, and thus costly, risk of damage as a result of the projecting motors, which also render these units bulky and, moreover, have an adverse affect on their appearance.

The object of the invention is to provide a support for semitrailers, even with a motor drive, which is robust, compact and aesthetically pleasing. Moreover, the intention is for the motor drive to switch off automatically.

SUMMARY OF THE INVENTION

The object is achieved according to the invention by providing a support having a stationary outer support tube, an inner support tube, which is arranged in a longitudinally displaceable manner therein, and a gearbox output shaft, on which are seated in a rotationally fixed manner a gearwheel and a likewise rotationally fixed bevel pinion, the bevel pinion belonging to a spindle drive via which the inner support tube is moved when the said gearwheel is driven alternately via a motor-drive pinion or a manual-drive pinion, or no manual-drive pinion for driving the gearwheel being present above the gearbox output shaft, characterized in that a motor which is arranged horizontally, transversely and/or laterally above the axis of the spindle is installed in a support and a pinion is seated on its shaft, in that the shaft journal of the motor has a toothing formation which is adequate for the pinion and this toothing formation is in sole engagement with the gearwheel or in that, as an alternative in some cases, the manual-drive pinion of a known manual-drive mechanism drives the gearwheel, and in that provided in the support is a switch-off device which automatically stops the motor when the support foot has been positioned on the ground.

In the case of this invention, the motor is installed transversely in the semitrailer support, horizontally and parallel to the axis of the gearbox output shaft of the support.

The motor is fastened in the support wall, in which the motor pinion is advantageously also mounted, this pinion engaging in the gearwheel on the gearbox output shaft.

In a manner which is favourable in terms of installation and cost, the abovementioned gearwheel and the bevel wheel, which is likewise to be secured on the gearbox output shaft, can be connected to one another or configured in one piece, i.e. as a unit. It is particularly advantageous to arrange this unit or individual wheels on the output side.

As an alternative to this, it is also possible to provide the gearwheel with a hub which can be mounted together with the gearbox output shaft.

If the motor is installed in the support with its shaft journal oriented in the direction of the rear side of the support and its pinion is provided with a projecting bearing journal, it is possible to use this bearing journal to mount the pinion with the motor shaft inserted therein. According to the invention, the mounting takes place in a closed collared bushing which is seated in the rear wall of the outer support tube and the screw-on plate of the support. In the case of this mounting arrangement, which is expedient because it saves space, the motor can be screwed on in an easy-to-install manner from the outside against a flange segment, which provides a free space for the region in which the motor pinion meshes with the driveable gearwheel on the gearbox output shaft. In the case of this configuration, it is possible to utilize a relatively large amount of installation space in the support for the motor. In the case where a relatively long motor is to be used, this arrangement additionally provides the advantage that, with a slightly greater motor length, the end of the motor can project beyond the front wall of the outer support tube, this wall being provided with an installation cutout. The end of the motor can then simply be covered by way of a corresponding local low-depth convexity in the, in the case of the first exemplary embodiment vertically flush, termination region of a closure cap. In the case of a slightly thicker motor, the closure cap can be displaced upwards in a similar manner by means of a corresponding convexity.

The drive according to the invention can likewise be realized if the gearwheel which is to be driven by the motor is located, as an individual wheel, opposite the output side of the gearbox output shaft, i.e. is placed in the direction of the front side of the support, and the bevel wheel remains individually, as a pinion, on the output side of the gearbox output shaft.

The same applies if the entire upper wheel unit, comprising the bevel wheel and the gearwheel which can be driven by the motor pinion and/or, in the case of other gear-mechanism configurations, possibly a further gearwheel, is located internally on the front wall of the support. All that is required with these configurations is for the motor to be fastened the other way round and for its pinion to be mounted correspondingly in a removable part on the front side.

According to another idea of the invention, it is provided that the outer support tube body is divided horizontally and the motor drive and/or a manual-drive mechanism of the invention in accordance with DE 203 07 381 U1 are/is installed in a removable shroud-like housing part at the top, which is nevertheless preferably also open at the rear. For this purpose, it is proposed for the dividing joint preferably to be positioned heightwise such that the front housing region of the mountings of the gearbox output shaft is divided.

This configuration has the advantage that the entire drive combination or else just the manual-drive mechanism can be preassembled as a subassembly separately from the main support body and then, just positioned on the main part of the support and fitted against the screw-on surface, can be screw-connected. In the case of supports without a drive, all that is required instead is for a small covering shroud to be placed in position. These straightforward mounting operations can advantageously take place during final support installation, this largely avoiding a split in production in comparison with the supports without a drive which are merely to be driven along. Moreover, this configuration provides significant advantages in terms of logistics, maintenance and repair.

In order that, during motor-driven operation, the semitrailer support switches off automatically when, during the disconnecting operation, its foot has been positioned on the ground at the disconnecting location, a switch-off device is provided according to the invention. A limit switch which is fastened on or in the nut of the spindle drive, and thus moves vertically up and down therewith in the case of driving, is proposed for this purpose.

If the form-fitting connection between the nut and the inner support tube is provided with vertical play, this results in the abovementioned components being able to move relative to one another. According to the invention, all that is required for this purpose is to provide vertical slots in the wall of the inner support tube for the load-bearing bolts projecting into these slots.

As a result of the displacement of the inner support tube relative to the nut, in the case of a switching-area overlap of the limit switch, for which a contactless variety is proposed, the motor is stopped by a straightforward contact maker in the abovementioned positions of the inner support tube.

BRIEF DESCRIPTION OF THE DRAWINGS

Advantageous configurations of the invention can be gathered from the subclaims.

The invention will be explained hereinbelow with reference to the drawings, in which:

FIG. 1 shows a front view of the support according to the invention,

FIG. 2 shows a side view of the support shown in FIG. 1, and

DETAILED DESCRIPTION

Figure 3:
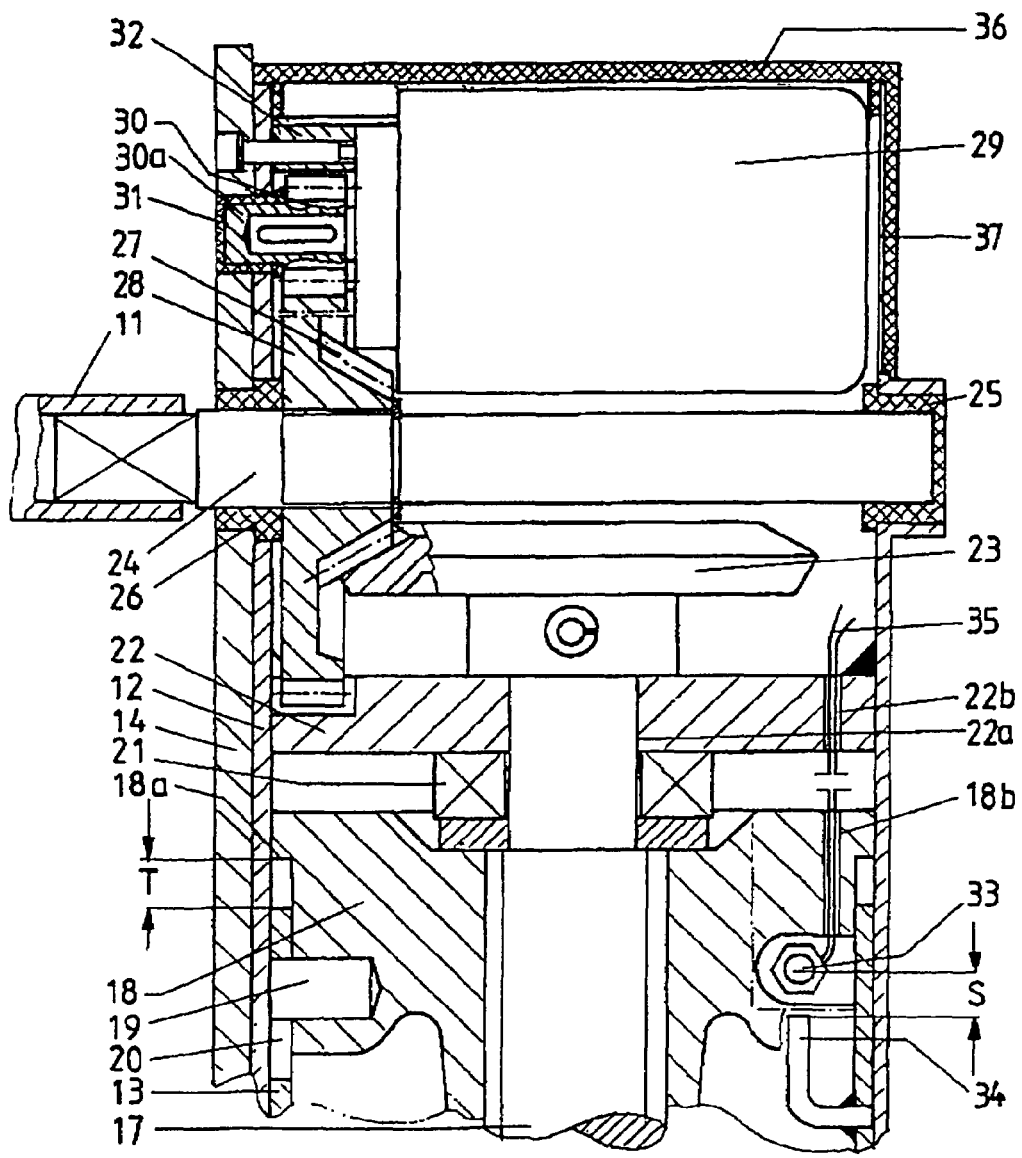
FIG. 3 shows a longitudinal section of the support along line A-A in FIG. 1.

The support 10 shown in FIGS. 1 to 3 is fastened in a paired arrangement on the chassis of a semitrailer, in the front region thereof, and is retracted, i.e. in the shortened state, in the transporting position. The supports 10 are extended before the semitrailer is uncoupled from the articulated lorry.

Since the supports 10 of each pair are of more or less identical construction and because the second support, which is usually driven along by a first support 10 via a connection shaft 11, differs from the first support mainly just by way of a more straightforward gear mechanism, with only one bevelwheel stage, it will suffice here to describe a drive-side support 10.

The support 10 has an outer support tube 12 and an inner tube 13 mounted in a longitudinally displaceable manner therein.

The outer support tube 12 and the inner support tube 13 have a square cross section.

The support 10 is fastened, on its rear side, on the semitrailer via a screw-on plate 14 seated on the outer support tube 12.

A foot 15 for support on the ground is fastened at the bottom end of the inner support tube 13.

Located on the front side of the support 10 is a pivot-away hand crank 16 for the manual drive.

The support 10 has a spindle 17 with a nut 18.

Inserted in the nut 18 are laterally projecting load-bearing bolts 19 which project into vertical slots 20 located in the top end region of the inner support tube 13 and bear the latter. The nut 18 also has a downwardly directed load-bearing periphery 18a, which corresponds to the profile of the inner support tube 13.

Seated on the shoulder of the spindle 17 is a disc, on which is located an axial bearing 21 which is supported on a bearing plate 22.

The bearing plate 22 is welded into the outer support tube 12 and has a bearing bore 22a passing through it in order to mount the spindle 17 radially.

Located above the bearing plate 22, on a journal of the spindle 17, is a bevel wheel 23, which is pinned to this journal.

Arranged in the centre of the support 10, and above the bevel wheel 23, is a gearbox output shaft 24 which is mounted in the walls of the outer support tube 12, in an outwardly closed collared bushing 25 on the front side of the support 10 and in a bushing 26 on the rear side, projecting on the outside.

A bevel wheel 27 of relatively small diameter and a gearwheel 28 are seated as a unit on the output side of the gearbox output shaft 24, on a multi-splined toothing formation.

Located above the gearbox output shaft 24, parallel to the latter and in a laterally offset manner, is a motor 29, a rotationally fixed pinion 30 being seated on the drive shaft thereof.

The pinion 30 has, oriented away from the motor 29, a bearing journal 30a by means of which it is mounted in a closed collared bushing 31, seated in the wall of the outer support tube 12 and in the screw-on plate 14, and engages in the gearwheel 28.

The motor 29 is screw-connected against a flange segment 32 from the screw-on plate 14.

A contactless limit switch 33 and a switching hook 34 are installed as an automatic switch-off device in the support 10.

The limit switch 33 is seated in the nut 18 and is thus moved up or down with the latter.

The switching hook 34 is fastened on the inside of the inner support tube 13 and moves up or down with the latter.

The connection cables 35 of the limit switch 33 are guided through cable ducts 18b and 22b in the nut 18 and the bearing plate 22.

The connection cables 35 are laid in coiled form in the variable free space between the nut 18 and the bearing plate 22, in order that they open up and pull together in the manner of a helical spring when the inner support tube 13 is moved up and down.

Seated at the top end of the outer support tube 12 is a closure cap 36, which hermetically seals the cross section of the outer support tube and an installation cutout 37 for the motor 29, this cutout being located on the front side of the outer support tube 12.

The automatic switch-off device functions as follows:

During travel or in the stationary, connected-up state of the articulated lorry, the inner support tube 13 hangs, by way of the top peripheries of its slots 20, on the load-bearing bolts 19. If, for the purpose of disconnection, the inner support tube 13 is extended by motor in a non-loaded state, the foot 15 is positioned on the ground straight away at the disconnecting location and arrests the inner support tube 13. The nut 18, however, moves further downwards and executes a relative movement in relation to the inner support tube 13. If the nut 18 has proceeded further by the switching distance S, the switching hook 34 activates the limit switch 33 and the latter switches the motor off. At a discrete point in time thereafter, as the spindle drive is coming to a stop, the nut 18 is positioned, by way of its load-bearing periphery 18a, on the end side of the inner support tube 13 because the displacement distance T up until the nut 18 achieves load-bearing capabilities is only slightly greater than the switching distance S. As an alternative, it is also possible, with the provision of a somewhat greater difference between S and T, for the nut 18 to take over the load for the first time by way of a small setting operating following disconnection.

In the case of a connecting-up operation, once the articulated lorry has taken over the load of the semitrailer, the inner support tube 13 of the support 10 is moved upwards by motor, the inner support tube 13 being carried along by the load-bearing bolts 19 following a minimal idle displacement of the nut 18, corresponding to T.

A manual-drive mechanism which is advantageously arranged parallel to the above described motor drive in the outer support tube, as is illustrated externally in FIGS. 1 and 2, is not shown or described here, especially since it is located outside the section plane of FIG. 3 and is a feature of the invention in accordance with DE 203 07 381 U1.

The invention claimed is:

1. A height adjustable support comprising a stationary outer support tube, an inner support tube arranged in a longitudinally displaceable manner in the outer support tube, a gearbox output shaft mounted for rotational movement in the outer support tube, a bevel gear fixed to the gearbox output shaft, a spindle drive means engaged with the bevel gear for displacing the inner support tube within the outer support tube, a gearwheel fixed to the gearbox output shaft and engaging a pinion of a drive motor means, for driving the gearwheel, the gearbox output shaft, the bevel gear and the spindle drive means for moving the inner support tube, and a switch off device which deactivates the drive motor means when an end of the inner support tube abuts a surface, wherein the pinion has a projecting bearing journal by means of which it is mounted in a collared bushing which is seated in a wall of the outer support tube.

2. A height adjustable support comprising a stationary outer support tube, an inner support tube arranged in a longitudinally displaceable manner in the outer support tube, a gearbox output shaft mounted for rotational movement in the outer support tube, a bevel gear fixed to the gearbox output shaft, a spindle drive means engaged with the bevel gear for displacing the inner support tube within the outer support tube, a gearwheel fixed to the gearbox output shaft and engaging a pinion of a drive motor means, for driving the gearwheel, the gearbox output shaft, the bevel gear and the spindle drive means for moving the inner support tube, and a switch off device which deactivates the drive motor means when an end of the inner support tube abuts a surface, comprising a connection means between the inner support tube and a nut on the spindle for displacing these components smoothly relative to one another a distance T, wherein the inner support tube is provided at a top region with at least one slot into which an associated load-bearing bolt projects, the bolt being inserted in the nut and limiting the displacement of the nut relative to the inner support tube.

3. A height adjustable support comprising a stationary outer support tube, an inner support tube arranged in a longitudinally displaceable manner in the outer support tube, a gearbox output shaft mounted for rotational movement in the outer support tube, a bevel gear fixed to the gearbox output shaft, a spindle drive means engaged with the bevel gear for displacing the inner support tube within the outer support tube, a gearwheel fixed to the gearbox output shaft and engaging a pinion of a drive motor means, for driving the gearwheel, the gearbox output shaft, the bevel gear and the spindle drive means for moving the inner support tube, and a switch off device which deactivates the drive motor means when an end of the inner support tube abuts a surface, the switch off device comprises a limit switch and a switching hook which is fastened to the inner support tube, the limit switch is contactless and switches off when its switching area senses the switching hook.

4. A height adjustable support comprising a stationary outer support tube, an inner support tube arranged in a longitudinally displaceable manner in the outer support tube, a gearbox output shaft mounted for rotational movement in the outer support tube, a bevel gear fixed to the gearbox output shaft, a spindle drive means engaged with the bevel gear for displacing the inner support tube within the outer support tube, a gearwheel fixed to the gearbox output shaft and engaging a pinion of a drive motor means, for driving the gearwheel, the gearbox output shaft, the bevel gear and the spindle drive means for moving the inner support tube, a switch off device which deactivates the drive motor means when an end of the inner support tube abuts a surface, and further including a motor and bearing carrier to fasten the drive motor means to the outer support tube, and to mount the pinion.

5. A support according to one of claims 1, 2 and 3, wherein the drive motor means extends lengthwise, as seen from the axis of the spindle, both in the direction of a front side of the support and in the direction of a rear side of the same.

6. A support according to one of claims 1, 2 and 3, wherein the drive motor means is installed in the support such that a shaft journal thereof is oriented in the direction of the rear side of the support.

7. A support according to one of claims 1, 2 and 3, wherein the drive motor means is installed in the support such that a shaft journal thereof is oriented in the direction of the front side of the support.

8. A support according to one of claims 1, 2 and 3, wherein the gearwheel and the bevel gear are installed on an output side of the gearbox output shaft.

9. A support according to one of claims 1, 2 and 3, wherein the gearwheel and the bevel gear together form a single-piece component.

10. A support according to one of claims 1, 2 and 3, wherein the gearwheel has a projecting hub by means of which it is mounted together and concentrically with the gearbox output shaft.

11. A support according to one of claims 1, 2 and 3, wherein the pinion has a projecting bearing journal by means of which it is mounted in a collared bushing which is seated in a wall of the outer support tube.

12. A support according to one of claims 1, 2 and 3, wherein the drive motor means is screw-connected from outside the support.

13. A support according to one of claims 1, 2 and 3, wherein the drive motor means is seated on a flange segment which is thicker than the tooth width of the gearwheel and has a free space in which the pinion and the gearwheel mesh with one another.

14. A support according to one of claims 1, 2 and 3, wherein means is provided for fastening the drive motor means to the outer support tube and to mount the pinion.

15. A support according to one of claims 1, 2 and 3, wherein the pinion is in permanent engagement with the gearwheel.

16. A support according to one of claims 1, 2 and 3, wherein closure cap means is seated on a periphery of the outer support tube for covering same and, has a vertical region which covers an installation cutout which is provided for installing the drive motor means in the outer support tube.

17. A support according to claim 16, wherein the closure cap has on a front side a convexity into which the drive motor means can project beyond the outer support tube.

18. A support according to claim 2, wherein the switch-off device comprises a limit switch and a switching hook which is fastened to the inner support tube.

19. A support according to claim 18, wherein the limit switch is contactless and switches off when its switching area senses the switching hook.

20. A support according to claim 18, wherein connection cables of the limit switch are guided through a cable duct in the nut and a cable duct in a bearing plate secured to the outer support tube.

21. A support according to claim 18, wherein connection cables are arranged in coiled form in the free space between the nut and a bearing plate secured to the outer support tube.

22. A support according to claim 3, further comprising a connection means between the inner support tube and a nut on the spindle for displacing these components smoothly relative to one another a distance T.

23. A support according to claim 22, wherein the inner support tube is provided at a top region with at least one slot into which an associated load-bearing bolt projects, the bolt being inserted in the nut and limiting the displacement of the nut relative to the inner support tube.

24. A support according to claim 22, wherein the limit switch is fastened to the nut.

* * * * *

UNITED STATES PATENT AND TRADEMARK OFFICE
CERTIFICATE OF CORRECTION

PATENT NO.        : 7,575,249 B2
APPLICATION NO.   : 11/000600
DATED             : August 18, 2009
INVENTOR(S)       : Reinhold Riedl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this

Seventh Day of September, 2010

David J. Kappos
*Director of the United States Patent and Trademark Office*